US010616284B2

(12) United States Patent
Xue et al.

(10) Patent No.: US 10,616,284 B2
(45) Date of Patent: Apr. 7, 2020

(54) STATE-BASED LOGGING FOR A VIEWING SESSION

(71) Applicant: Facebook, Inc., Menlo Park, CA (US)

(72) Inventors: Mao Xue, Fremont, CA (US); Jing Fang, Menlo Park, CA (US); Harish Srinivas, Union City, CA (US); Hong Yan, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 231 days.

(21) Appl. No.: 14/965,783

(22) Filed: Dec. 10, 2015

(65) Prior Publication Data
US 2017/0171252 A1    Jun. 15, 2017

(51) Int. Cl.
| *H04L 29/06* | (2006.01) |
| *H04L 29/08* | (2006.01) |
| *G06Q 50/00* | (2012.01) |
| *G06Q 30/02* | (2012.01) |

(52) U.S. Cl.
CPC ..... *H04L 65/1069* (2013.01); *G06Q 30/0251* (2013.01); *G06Q 50/01* (2013.01); *H04L 65/1046* (2013.01); *H04L 65/1083* (2013.01); *H04L 67/22* (2013.01); *H04L 67/2819* (2013.01)

(58) Field of Classification Search
CPC .................................................. H04L 65/1069
See application file for complete search history.

(56) References Cited

U.S. PATENT DOCUMENTS

| 9,485,298 | B2* | 11/2016 | Joch | .................. H04N 21/2401 |
| 9,872,069 | B1* | 1/2018 | Funk | .................... H04N 21/442 |
| 2010/0287040 | A1* | 11/2010 | Martin-Cocher | ...... G06Q 30/02 |
| | | | | 705/14.4 |

(Continued)

FOREIGN PATENT DOCUMENTS

| GB | 2511855 A | * | 9/2014 | ......... G06Q 30/0242 |
| GB | 2511855 A | * | 9/2014 | ......... G06Q 30/0242 |

OTHER PUBLICATIONS

Morgi_a, "A Simple State Machine". (https://www.codeproject.com/Articles/43356/A-Simple-State-Machine), Jan. 23, 2014 captured on Oct. 21, 2015 (Year: 2015).*

(Continued)

*Primary Examiner* — Hamza N Algibhah
*Assistant Examiner* — James Ross Hollister
(74) *Attorney, Agent, or Firm* — Jordan IP Law, LLC

(57) ABSTRACT

In one embodiment, a method includes a computer server machine receiving information about a first media player event with the information about the first media player event including a viewing session identifier. Using a state machine, the computer server machine identifies a current state of the viewing session using the information about the first media player event. The computer server machine receives information about a second media player event. Using a state machine, the computer server machine identifies a subsequent state of the viewing session using the information about the second media player event. The computer server machine calculates metrics for the viewing session based on the current state and subsequent state, and stores the metrics. The computer server machine generates a session summary with the session summary including information about the metrics for the viewing session.

20 Claims, 5 Drawing Sheets

(56) References Cited

U.S. PATENT DOCUMENTS

| | | | | |
|---|---|---|---|---|
| 2013/0077940 | A1* | 3/2013 | Shackleton | H04N 5/91 386/249 |
| 2014/0143670 | A1* | 5/2014 | Swaminathan | G06F 3/0481 715/720 |
| 2014/0257923 | A1* | 9/2014 | Funk | H04L 67/22 705/7.29 |

OTHER PUBLICATIONS

Drumea et al., "Finite state machines and their applications in software for industrial control", 27th International Spring Seminar on Electronics Technology: Meeting the Challenges of Electronics Technology Progress, https://doi.org/10.1109/ISSE.2004.1490370, 2004. (Year: 2004).*

Oguike, Osondu. (2014). Finite State Machine: A Model for Validating Variants of Input Data. African Journal of Computing & ICT. 7. (Year: 2014).*

* cited by examiner

STATE-BASED LOGGING FOR A VIEWING SESSION

TECHNICAL FIELD

This disclosure generally relates to tracking and reporting metrics for a viewing session using a state-based logging technique.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

In addition, the mobile computing device may communicate raw video player events to a social-networking system. The social-networking system may communicate the raw video player events to third-party systems. The third-party systems may process the raw video player events to generate metrics.

SUMMARY OF PARTICULAR EMBODIMENTS

Particular embodiments provide techniques to store, validate, and report metrics for a viewing session using a state-based logging technique. Particular embodiments enable a system to receive a first media player event from a client device. The system may use a state machine to identify a current state of the viewing session using the received media player event. The system may also receive a second media player event from a client device. A state machine may then be used to identify a subsequent state of the viewing session using the second media player event. The system may then calculate metrics for the viewing session based on the current state and the subsequent state. Third-party systems may also receive a session summary of these metrics.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In an event-based logging system, mobile computing device may communicate raw video player events to a social-networking system. The social-networking system may communicate the raw video player events to third-party systems. The third-party systems may process the raw video player events to generate metrics.

This approach may be limited and inefficient. For example, each third-party system may need to implement its own logic to generate metrics on the raw video player events. Moreover, discrepancies in metrics may occur as each third-party system implements its own algorithms to determine the metrics. In addition, an event-based logging system is difficult to debug since the metrics are calculated at the third-party system. As another example, the social-networking system may only process individual video player events. This approach may overlook related video player events for a viewing session.

Accordingly, particular embodiments provide techniques to store, validate, and report metrics for a viewing session using a state-based logging technique. A computer server machine receives a first media player event and identifies a current state of a viewing session using a state machine. The computer server machine may also receive a second media player event. Using the state machine, the computer server machine may determine a subsequent state of the viewing session. The computer server machine may then calculate metrics for the viewing session based on its current state and subsequent state.

By using a state machine to track the state of the viewing session and also receiving the media player events, calculating the metrics, and reporting information about the metrics through the computer server machine, the present disclosure may remove the majority of constraints associated with an event-based logging system. As one example, the present disclosure allows for computer server machine to develop an analysis of an entire viewing session, even if the entire viewing session contains multiple media player events. As another example, the computer server machine may determine the current state of a viewing session by using the state machine. The present disclosure also provides more flexibility and accuracy in developing metrics based on received media player events.

Figure 1:
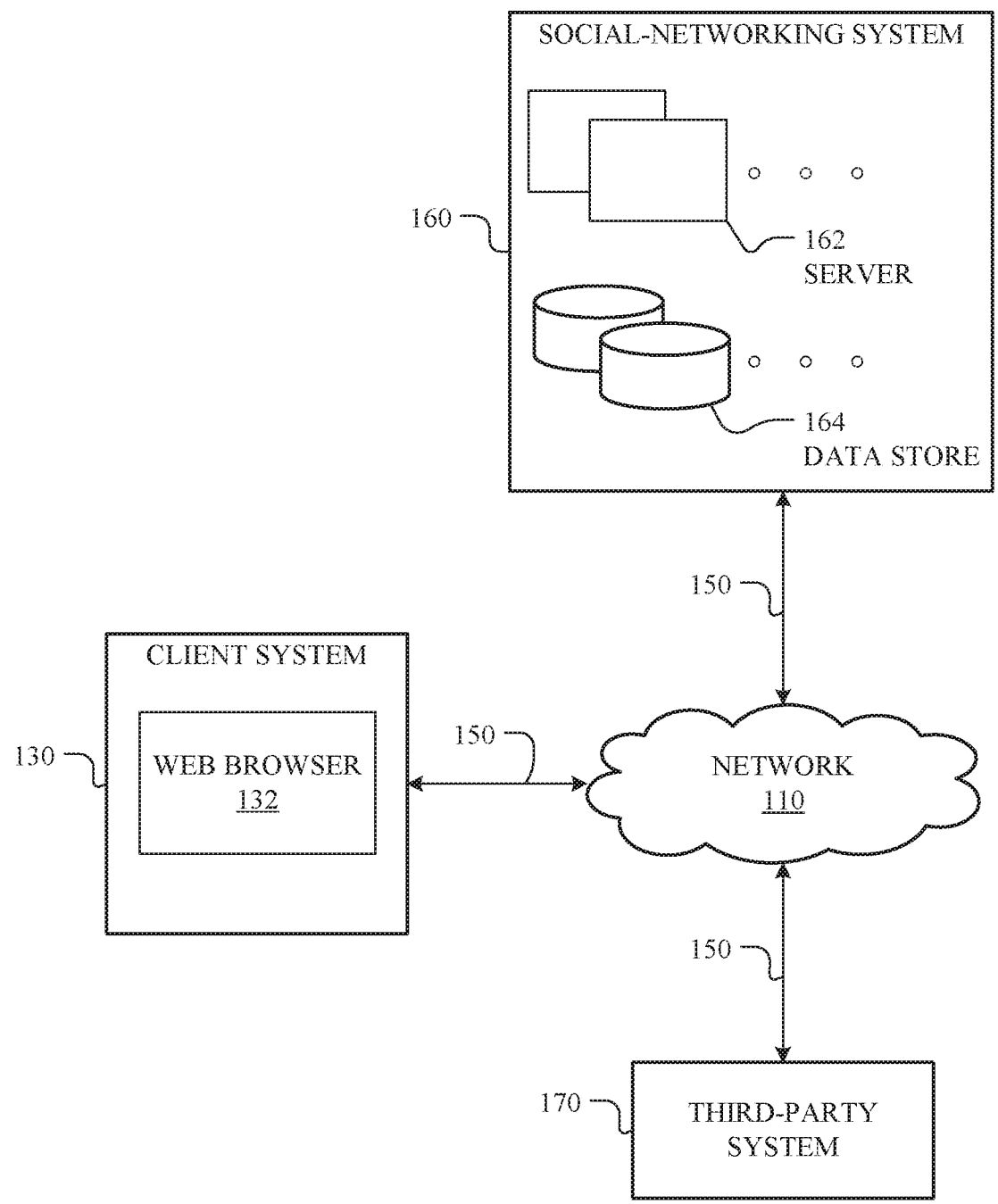
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

Client system 130 may be capable of displaying a media player. Typically, a media player is a type of software that plays a media item. A media item may be a type of file, such as an audio, video, or animation file, on client system 130. A media item may also have a specific identifier identifying the media item or identifying whether the media item is an advertisement or a non-advertisement. The media player may be an application that runs on client system 130, may be part of an application that runs on client system 130, accessed by web browser 132, or may be embedded in an application that runs on client system 130. A user may interact with client system 130 to view a media item using the media player.

A viewing session generally is a series of actions a user conducts on the media player on client system 130. In certain embodiments, a viewing session may contain a maximum duration, wherein the viewing session ends if the user of client system 130 does not perform an action within that maximum duration. In certain embodiments, a maximum duration may be preset, such as 30 minutes, or it may be adaptive based on the length of the media item. In particular embodiments, a viewing session may relate to a particular media item. Each viewing session on client system 130 may also be associated with an identifier. The identifier may uniquely identify the viewing session for social-networking system 160.

Client system 130 may also be capable of communicating information about one or more media player events. A media player event may include a detection of a user input denoting a particular type of media player instruction, such as play, pause, rewind, and fast forward. Further examples of media player instructions include loading media items, aborting the media player, changing audio and/or video, muting the audio, minimizing the media player, or any other interaction that may cause a change in the media player or media item.

Information about one or more media player events may include additional information regarding the user of client system 130, the media player, the media item, or any other information that is associated with the media player event. For example, the information about the media player events may include a total duration of the media item associated with the viewing session. As another example, the information about the media player events may include an indicator relaying whether the media item is an advertisement or non-advertisement. Media player events may also include the parameters regarding the viewing of the media item, such as the player form of the viewing session, an identifier for the media item, volume of the playing session, time position of the media item, buffer time or stall time associated with the video, whether the viewing session is in full screen mode, whether the viewing session was initiated by autoplay, whether the viewing session is in High Definition ("HD").

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110.

In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by servers 162.

In particular embodiments, social-networking system 160 may include one or more data stores 164. Data stores 164 may be used to store various types of information, such as information about media player events or calculated metrics. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In some embodiments, a particular module, such as a computer server module, may receive information about media player events, identify a subsequent state of a viewing session, calculate metrics for the viewing session, generate session summaries of the viewing session, calculate delta session summaries for the viewing session, and communicate information to third-party system 170. In certain embodiments, server 162 comprises a computer server machine. Computer server machine may be any component in social-networking system 160, and can communicate with any component inside social-networking system 160. However, although computer server machine is described herein as server 162, computer server machine may be any component that exists independent of social-networking system 160. For example, computer server machine may be a standalone module that is external to social-networking system 160. In particular embodiments, computer server machine may communicate with third-party system 170 and client system 130.

Server 62 may also use a state machine to identify the current state of a viewing session. In particular embodiments, the state machine may store the status of a viewing session on client system 130 at a given time. In addition, the state machine may change the stored state of the viewing session based on one or more media player events. In an exemplary embodiment, server 62 uses the state machine to imitate the media player on client system 130. The state machine may be used to process media player events in order and also determine the current state of the media player of the viewing session. In addition, the state machine may help verify if the received media player events are correct. For example, if the state machine is in a paused state, server 62 will determine that a pause event should not be the next media player event by using the state machine.

In an exemplary embodiment of operation, client system 130 may communicate information about a first media player event and an identification for a viewing session to server 162. In certain embodiments, client system 130 communicates a batch of media player events to server 162. For example, client system 130 may communicate a batch of media player events for every fifty media player events generated or may communicate a batch of media player events every 10 minutes. Server 162 may use the state machine to identify a current state of the viewing session using the information about the first media player event. In a particular embodiment, server 162 also calculates metrics based on the first media player event and stores the metrics on the first media player event in data store 164.

Client system 130 may also communicate information about a second media player event for the same viewing session to server 162. Using the state machine, client server machine 162 may identify a subsequent state for the viewing session using the information about the second media player event. Client server machine 162 may also calculate metrics based on the current state and subsequent state of the viewing session and store these metrics in data store 164. In a particular embodiment, client server machine generates a session summary comprising information about the metrics of the viewing session and communicates the session summer to third-party system 170. Session summary may include metrics regarding the viewing session. For example, session summary may comprise the identifier for the viewing session, a user identification, identification of the media item, whether the video was played because the media player auto-played the video, or identification if the media item is an advertisement or a non-advertisement. In addition, metrics for the viewing session may be calculated, such as a viewing duration, a pause duration, time on mute, view count, or any other metric that can be calculated from the received media player events.

For example, client server machine 162 may determine whether a viewing duration of the viewing session satisfies a view threshold (e.g., to establish a view count). In certain embodiments, the view threshold may be predetermined (e.g., 30 seconds). The view threshold, however, may be adaptive. For instance, client server machine 162 may calculate the view threshold based on the total duration of the media item associated with the viewing session. In certain embodiments, client server machine 162 may contain multiple viewing thresholds to establish different types of view counts. For example, client server machine 162 may set a view threshold at 2 seconds to establish a view count and also a second view threshold at 30 seconds to establish a true view count.

In certain embodiments, each media player event further comprises a time stamp. In addition, client system 130 may communicate a first media player event with a first time stamp that occurs after the second media player event with a second time stamp. Server 162 may identify the current state of the viewing session based on the information about the second media player event and identify the subsequent state of the viewing session based on the information about the first media player event. Server 162 may correct any media player events received out of order.

In a particular embodiment, client system 130 may communicate information about a third media player event for the same viewing session to server 162. Again, using the state machine, client server machine 162 may identify an updated state of the viewing session using the information about the third media player event. Server 162 may calculate updated metrics for the viewing session based on the metrics previously calculated for the viewing session and the updated state. Server 162 may store these updated metrics in data store 164. In addition, server 162 may calculate a delta session summary of the viewing session based on the session summary and information about the updated metrics, and send the delta session summary to third-party system 170. In certain embodiments, the delta session summary represents the difference between the previously-determined metrics and the updated metrics. In an exemplary embodiment, third-party system 170 may aggregate the received session summary and delta summary to determine the total metrics for the viewing session.

In certain embodiments, server 162 may first determine whether the media item associated with the viewing session comprises a non-advertisement. For instance, client system 130 may communicate whether the media item comprises a non-advertisement. In certain embodiments, server 162 determines whether the media item identification associated with the viewing session is associated with a non-advertisement mediate item. If the media item is a non-advertisement, server 162 may combine the previously-generated session summary with the delta session summary into a complete session summary. Server 162 may then communicate the complete session summary to third-party system 170. Alternatively, if the media item is an advertisement, server 162 may communicate the session summary and delta session summary separately to third-party system 170 without combining the session summary and the delta session summary.

In a particular embodiment, server 162 may communicate a batch of session summary and delta summaries to third-party system 170. For example, computer server machine 130 may communicate a batch of session summary and delta summaries after receiving fifty media player events. As another example, server 162 may communicate a batch of session summary and delta summaries events every 10 minutes. In certain embodiments, server 162 may combine the batch of session summary and delta summaries before communicating the batch to third-party system 170.

In a particular embodiment, a maximum duration is set for the viewing session. The maximum duration may be predetermined (e.g., 45 minutes) or may be adaptive based on factors such as the length of the media item. In certain embodiments, if server 162 receives information about a media player event wherein the media player event occurs within the maximum duration of the last received media player event, server 162 will process the information about the media player event. In particular embodiments, if server 162 receives information about a media player event wherein the media player event occurs within the maximum duration from the initial media player event, server 162 will process the information about the media player event. However, in certain embodiments, if server 162 receives information about a media player event wherein the media player event occurs at a time beyond the maximum duration for the viewing session, server 162 will not process the information about the media player event. In certain embodiments, server 162 will delete the information about the media player event and process the previously-received media player events as if the latest media player event was not received.

In a particular embodiment, server 162 validates the received information about the one or more media player events. In certain embodiments, server 162 may only send a session summary or delta session summary after validating the received information about the one or more media player events. To validate the received information about a media player event, server 162 may apply an event validation rule set that indicates if the reported information of the media player event is reliable. An example set of event validation rule names, description, and associated actions are listed in the table below. In certain embodiments, if a validation rule indicates that the received media event is unreliable, computer server machine may employ the associated action to either the received information regarding the media player event or generated session summary/delta session summary.

| Validation Rule for Received Media Player Events | Description | Action |
| --- | --- | --- |
| Impossible Closing Event | The information regarding the media player event contains a paused event while the player is in a paused state. | Remove session summary/delta session summary. |
| Impossible Closing Event Without Event Loss | In certain embodiments, client system 130 communicates a numerical identifier indicating the order of the media player event alongside the information about the media player event. Using the numerical identifier indicating the order of the media player event, server 162 may determine if information about a media player event is missing. | Remove session summary/delta session summary. |
| Invalid Media Item Length | In particular embodiments, the information about a media player event includes the length of the media item. This validation rule may pertain to the information about the media player event not including the length of the media item. | Remove session summary/delta session summary. |
| Missing Player Format | In certain embodiments, the information about the media player event may include the player format of the media player. This validation rule may pertain to the player format missing from the information about the media player event. | Remove the information about the media player event. |
| Missing Previous Player Format | In certain embodiments, the information about the media player event may include information that the player format of the media player changed. This validation rule may pertain to server 162 not receiving the previous player format. | Remove the information about the media player event. |
| Missing State | This validation rule may pertain to the information about the media player event not containing a state of the viewing session. | Remove the information about the media player event. |
| Missing User Identification | This validation rule may pertain to the information about the media player event not containing a user identification. | Remove the information about the media player event. |
| Missing User Identification with No IP Address | In particular embodiments, client system 130 may communicate an Internet Protocol ("IP") address instead of a user identification along with the information about the media player event. This validation rule may pertain to the information about the media player event not containing a user identification or an IP address for client system 130. | |
| Missing Media Item Identifier | This validation rule may pertain to the information about the media player event not containing a media item identification for client system 130. | Remove the information about the media player event. |
| Missing Viewing Session Time Position | In particular embodiments, client system 130 may communicate a viewing session time position in the information about the media player event. This validation rule may pertain to the information about the media player event not containing the viewing session time position. | Remove session summary/delta session summary. |
| Missing Volume | In particular embodiments, client system 130 may communicate a volume for the viewing session in the information about the media player event. This validation rule may pertain to the information about the media player event not containing the volume for the viewing session. | Remove session summary/delta session summary. |
| Negative Time Position | In particular embodiments, client system 130 may communicate a viewing session time position in the information about the media player event. This validation rule may pertain to the information about the media player event containing a viewing session time position that is negative. | Remove the information about the media player event. |
| Session Too Large | In certain embodiments, receiving a large number of media player events may be indicative of malicious behavior or bugs. This validation rule may pertain to receiving a large number of media player events for a viewing session. | Remove the information about the media player event. |

The validation rules for received media player events listed above are example validation rules. Server 162 may implement some, none, or all of the listed validation rules. In addition, server 162 may perform any particular action if the validation rule(s) are not met.

In addition to validating the events, server 162 may validate the information about the metrics regarding the viewing session before communicating the session summary or delta session summary to third-party system 170. In certain embodiments, server 162 may communicate the session summary or delta session summary only after server 162 validates the information about the metrics. An example set of validation rules to validate the information about the metrics is listed in the below table.

| Validation Rule for Generated Information Regarding Metrics | Description | Action |
| --- | --- | --- |
| Play Count of the Viewing Session + Unpause Count of the Viewing Session < Finish Count of the Viewing Session + Pause Count of the Viewing Session | Closing event count of a viewing session should not be larger than the starting event count of a viewing session. | Remove session summary/delta session summary. |
| Play Count of the Viewing Session < View Count of the Viewing Session | Play count of the viewing session should be larger than the view count of the viewing session. | Remove session summary/delta session summary. |
| Play Count of Viewing Session is 0 but Unpause Count of the Viewing Session > 0 | If an unpause count is received, the play count of the viewing session should be greater than 0. | Remove session summary/delta session summary. |
| View Count of Viewing Session < View Count with Sound On of Viewing Session | View count of a viewing session should always be greater than or equal to the view count with the sound on of a viewing session. | Remove session summary/delta session summary. |
| Play Count > 0 but No Information Received About Whether Playing of the Viewing Session was Initiated by Autoplay | In particular embodiments, media player event comprises an indication of whether playing of a media item was started by autoplay. If the information about metrics indicates that the play count is greater than 0 but no information was received on whether the viewing session started because of an autoplay, this may be in error. | Remove session summary/delta session summary. |
| Viewing Duration of Video Session ≤ 0 | The viewing duration of the video session must be greater than 0. | Remove session summary/delta session summary. |
| Viewing Duration of Video Session < Viewing Duration of Video Session with Sound On | The viewing duration of a viewing session should always be greater than or equal to the viewing duration with the sound on of a viewing session. | Remove session summary/delta session summary. |
| Viewing Duration of Video Session < Viewing Duration of Video Session in Full Screen mode | The viewing duration of a viewing session should always be greater than or equal to the viewing duration in full screen mode of a viewing session. | Remove session summary/delta session summary. |
| Viewing Duration of Video Session < Viewing Duration of Video Session in HD | The viewing duration of a viewing session should always be greater than or equal to the viewing duration in HD of a viewing session. | Remove session summary/delta session summary. |
| Viewing Duration of a Viewing Session > 0 but Play Count of the Viewing Session = 0 | If a viewing duration of a viewing session is greater than 0, an error may have occurred if the play count is not greater than 0. | Remove session summary/delta session summary. |

The validation rules for the information regarding the metrics listed above are example validation rules. Server 162 may implement some, none, or all of the listed validation rules. In addition, server 162 may perform any particular action if the validation rule(s) are not met.

Figure 2:
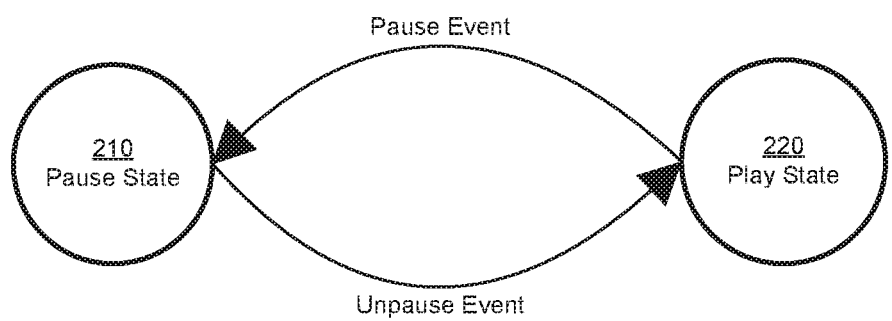
FIG. 2 illustrates an example state machine model of a state-based log for a viewing session.

An example state machine model 200 for the state-based logging for a viewing session is shown in FIG. 2. In this example, the states illustrated include pause state 210 (corresponding, e.g., to the media item being paused) and play state 220 (corresponding, e.g., to the media item being played).

Although this example only shows, for ease of illustration, two states, this disclosure contemplates any suitable number or type of states, sub-states, events or triggers and any suitable hierarchy in state machine model 200 for an application (e.g. for the state-based logging for a viewing session). Other such states (not illustrated in this example) may, for example, include a fast forward state (e.g., corresponding to the media item being fast forwarded), a rewind state (e.g., corresponding to the media item being rewound), minimized state (e.g., corresponding to the media player being minimized) or a mute state (e.g., corresponding to the media item being muted). In particular embodiments, state machine model 200 for the state machine may be based on a hierarchical model, and certain states of the model may, for example, be child states (or sub-states) of a parent state, inheriting behaviors or properties from the parent state. For example, a speed of fast forwarding may be a sub-state of a fast forward state. In particular embodiments, a child state may be entered only after particular actions have been completed after entry into a corresponding parent state.

As an example, state machine model 200 may, for example, enter play state 220 in response to receiving information about a first media player event indicating an unpause event for the media item. As another example, state machine model 200 may, for example, enter pause state 210 in response to receiving information about a second media player event indicating a pause event for the media item.

In particular embodiments, server 162 uses the state machine to identify the state of the viewing session. In certain embodiments, server 162 uses state machine to identify the current state of the viewing session in response to receiving a batch of media player events.

For example, server 162 may receive a first media player event indicating an unpause event. The state machine may transition to play state 220 based on the first media player event. Using the state machine, server 162 identifies the current state, play state 220, for the viewing session. Server 162 may later receive a second media player event indicating a pause event. The state machine may transition to pause state 210 based on the second media player event. Server 162 then identifies a subsequent state of the viewing session, pause state 210, using the state machine.

Figure 3:
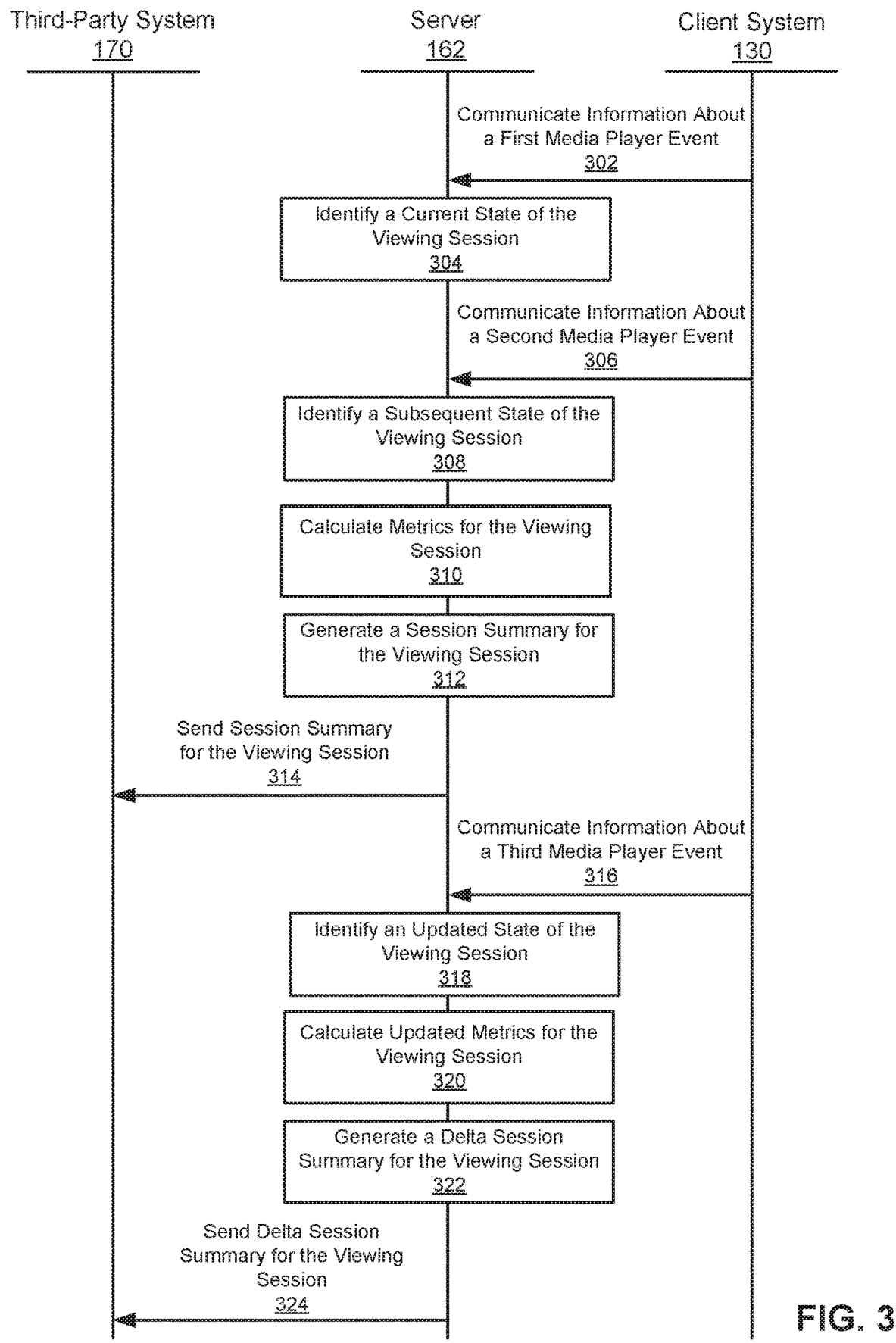
FIG. 3 illustrates an exemplary interaction diagram depicting the interaction that may occur between a client system, a server, and a third-party system.

FIG. 3 illustrates an exemplary interaction diagram 300 depicting the interaction that may occur between client system 130, server 162, and third-party system 170. More than one client system 130, server 162, and third-party system 170 may exist in the system described herein. Moreover, server 162 may comprise a computer server machine.

In step 302, client system 130 may communicate information about a first media player event to server 162. The first media player event may include a detection of a user input denoting a particular type of media player instruction. In particular embodiments, client system 130 may also communicate an identifier for the viewing session in the information about a first media player event such that server 162 may distinguish that viewing session from other concurrent viewing sessions.

In step 304, server 162 may identify a current state of the viewing session using both the state machine and the received information about the first media player event. The state machine may be used to process the received media player events in order and also determine the current state of the media player of the viewing session.

Client system 130 may communicate information about a second media player event in step 306. Similar to the first media player event, the second media player event may include a detection of a second user input denoting another particular type of media player instruction. In step 308, server 162 may identify a subsequent state of the viewing session using both the state machine and information about the second media player event.

In step 310, server 162 may calculate metrics for the viewing session based on the current state and the subsequent state. These metrics may include a total viewing duration, a total pause duration, view count, or any other metric that can be calculated based on the media player or the media item. In certain embodiments, server 162 may store these metrics in data store 164. In step 312, server 162 may generate a session summary of the viewing session. The session summary of the viewing session may comprise of information about the calculated metrics. For example, session summary may comprise a view duration, a pause duration, or any other information that relates to the received media player events or calculated metrics. Server 162 may send the session summary to third-party system 170 in step 314.

Client system 130 may communicate information about a third media player event in step 316. Similar to the first and second media player event, the third media player event may include a detection of a third user input denoting another particular type of media player instruction. In step 318, server 162 may identify an updated state of the viewing session using both the state machine and the received information about the third media player event.

In step 320, server 162 may calculate updated metrics for the viewing session based on the metrics for the viewing session and the updated state. Server 162 may store the updated metrics in data store 164. In step 322, server 162 may generate a delta session summary of the viewing session based on the previously-generated session summary and information about the updated metrics. In certain embodiments, the delta session summary represents the difference between the information regarding the previously-determined metrics in the session summary and the updated metrics. Server 162 may send the delta session summary to third-party system 170 in step 324.

Particular embodiments may repeat one or more steps in the interactions in FIG. 3, where appropriate. Although this disclosure describes and illustrates particular steps of the interactions of FIG. 3 as occurring in a particular order, this disclosure contemplates any suitable steps of the method of FIG. 3 occurring in any suitable order. Moreover, although this disclosure describes and illustrates an exemplary interaction for tracking and reporting metrics using a state-based logging technique, including the particular steps of the interactions of FIG. 3, this disclosure contemplates any suitable method for tracking and reporting metrics using a state-based logging technique, including any suitable steps, which may include all, some, or none of the steps of the method of FIG. 3, where appropriate. Furthermore, although this disclosure describes and illustrates particular components, devices, or systems carrying out particular steps of the interactions of FIG. 3, this disclosure contemplates any suitable combination of any suitable components, devices, or systems carrying out any suitable steps of the method of FIG. 3.

Figures 4A, 4B:
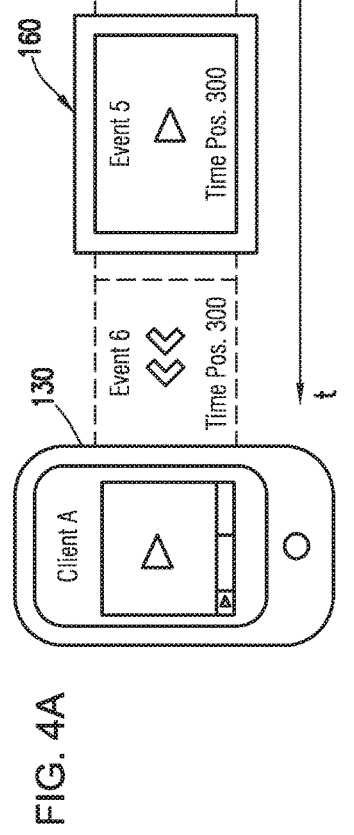
FIG. 4A-B illustrates an example media player event interaction diagram and generated reports.

FIGS. 4A-B illustrates an example media player event interaction diagram and generated reports. More particularly, FIG. 4A-B illustrate server 162 receiving media player events and generating a summary report and delta summary reports.

FIG. 4A illustrates an example communication of media player events between client system 130 and social-networking system 160. Social-networking system 160 may contain server 162, data store 164, and the state machine. Server 162 may comprise a computer server machine. In the illustration, client system 130 communicates six media player events in succession. Although illustrated as a single media player event being communicated, client system 130 may communicate a batch of media player events to social-networking system 160.

FIG. 4B illustrates the media player events received by server 162 and the reports generated upon receiving the media player events.

As illustrated, server 162 may receive information about a first media player event (corresponding, e.g., Event 1 in FIG. 4A) indicating an unpause event occurred at a time position of 0 seconds in the media item. State machine 164 then transitions its state to play state 220. Server 162 may receive a second media player event (corresponding, e.g., Event 2 in FIG. 4A) indicating a pause event at a time position of 2 seconds in the media item. The state machine accordingly transitions to pause state 210. Server 162 identifies a state of the viewing session using state machine 164. Server 162 also calculates metrics for the viewing session based on the previous state of the viewing session and the current state of the viewing session. As an example, because the state machine is in pause state 210, server 162 can calculate a total viewing duration for the viewing session (e.g., 2 seconds in this example). In addition, server 162 can determine if the viewing session can count as a view count. In this example, the viewing threshold is 30 seconds. Accordingly, server 162 determines that the view count is 0 because the total viewing duration is below the viewing threshold. Server 162 stores the first and second media player events and the calculated metrics for the viewing session in data store 164.

Server 162 may generate a session summary to communicate to third-party system 170. The session summary comprises information about the metrics previously calculated by server 162. In the illustration, the session summary contains a view duration of 2 seconds and a view count of 0.

Server 162 may also receive a third media player event (corresponding, e.g., Event 3 in FIG. 4A) indicating an unpause event occurred at a time position of 2 seconds in the media item. Server 162 may retrieve the stored metrics and media player events for this viewing session from data store 164. In certain embodiments, server 162 concatenates the previous media player events with the third media player event, and processes these concatenated events on state machine 164. State machine 164 then transitions its state to play state 220. Server 162 may identify an updated state of the viewing session using state machine 164. Server 162 may also calculate updated metrics for the viewing session based on the previously-calculated metrics and the updated state. In this example, server 162 calculates a total viewing duration of 2 seconds and the view count remains at 0. In certain embodiments, server 162 may calculate a total pause duration for the viewing session as well. Server 162 stores the media player events and these metrics regarding the viewing session in data store 164.

Server 162 may also generate a delta summary based on the previously-generated session summary and information about the updated metrics. In this example, computer server machine 142 generates a first delta summary (corresponding, e.g., to Delta Summary 1 in FIG. 4B). In particular, the viewing duration for the first delta summary is the difference between the total viewing duration of 2 seconds and the previously-reported session summary indicating a viewing duration of 2 seconds. Similarly, the view count of for the first delta summary is the difference between the view count of 0 for the calculated metrics and the previously-reported session summary indicating a view count of 0.

In the illustration, server 162 may receive a fourth media player event (corresponding, e.g., Event 4 in FIG. 4A) indicating an unpause event occurred at a time position of 300 seconds in the media item. Server 162 may retrieve the stored metrics and media player events from data store 164. In certain embodiments, server 162 concatenates the previous media player events with the fourth media player event, and processes these concatenated events on state machine 164. State machine 164 then transitions its state to pause state 210, and server 162 may identify an updated state of the viewing session using state machine 164. Server 162 may also calculate updated metrics for the viewing session based on the previously-calculated metrics and the updated state. In this example, server 162 calculates a total play duration of 300 seconds. Now, unlike before, the viewing duration is greater than the viewing threshold (30 seconds in this example). Accordingly, the view count for Event 4 will be 1. Server 162 may store the received media player events and updated metrics in data store 164.

Server 162 may generate a second delta summary (corresponding, e.g., to Delta Summary 2 in FIG. 4B) based on information about the updated metrics and the previously-generated reports (the session summary and first delta session summary). By using the updated metrics and the previously-generated reports, the second delta summary may contain a view duration of 298 seconds and a view count of 1. Server 162 may calculate the view duration of 298 seconds from the total view duration of 300 seconds and the previous session summary containing a view duration of 2 seconds. In addition, the second delta summary may contain a view count of 1 because the updated metrics contains a view count of 1, whereas the session summary contains a view count of 0.

Client system 130 may communicate a fifth media player event (corresponding, e.g., Event 5 in FIG. 4A) that may indicate an unpause event occurred at a time position of 300 seconds in the media item. Server 162 may retrieve the stored metrics and media player events from data store 164. In certain embodiments, server 162 concatenates the previous media player events with the fifth media player event, and processes these concatenated events on state machine 164. State machine 164, in turn, may transition its state to play state 220. Server 162 may calculate updated metrics of a total viewing duration of 300 seconds and a view count for the viewing session remaining at 1. Server 162 may store the updated metrics in data store 164.

Server 162 may generate a third delta summary (corresponding, e.g., to Delta Summary 3 in FIG. 4B) based on information about the updated metrics and the previously-generated reports (the session summary, first delta session summary, and second delta session summary). By using the updated metrics and the previously-generated reports, the second delta summary may contain a viewing duration of 0 seconds and a view count of 0. Server 162 may calculate the viewing duration of 0 seconds from the total viewing duration in the calculated metrics being 300 seconds and the aggregate viewing duration for the previously-generated reports being 300 seconds. In addition, server 162 may calculate the view count for the third delta session summary to be 0 by subtracting the aggregate view count of 1 from the previously-generated reports from the view count of 1 calculated in the updated metrics.

Notably, third-party system 170 may aggregate the generated reports to determine the total metrics for the viewing session. In the illustrated example, the aggregate of all the generated reports (Session summary, first delta session summary, second delta session summary, and third delta session summary) indicates the total metrics for the viewing session. For example, the aggregate metrics for the viewing session includes a total view duration of 300 seconds and a total view count of 1.

Finally, if server 162 does not receive a media player event indicating that an event occurred within a predetermined maximum duration for the viewing session (in this example, the maximum duration will be 15 minutes), server 162 may identify a final state of the viewing session. For example, server 162 may receive a sixth media player event (corresponding, e.g., Event 6 in FIG. 4A) that may indicate a rewind event occurred at a time position of 3000 seconds in the media item. Because the sixth media player event occurred after the maximum duration elapsed for the viewing session, server 162 may not include the sixth media player event in the calculations for the viewing session. Rather, server 162 may consider Event 5 the final state of the viewing session.

Figure 5:
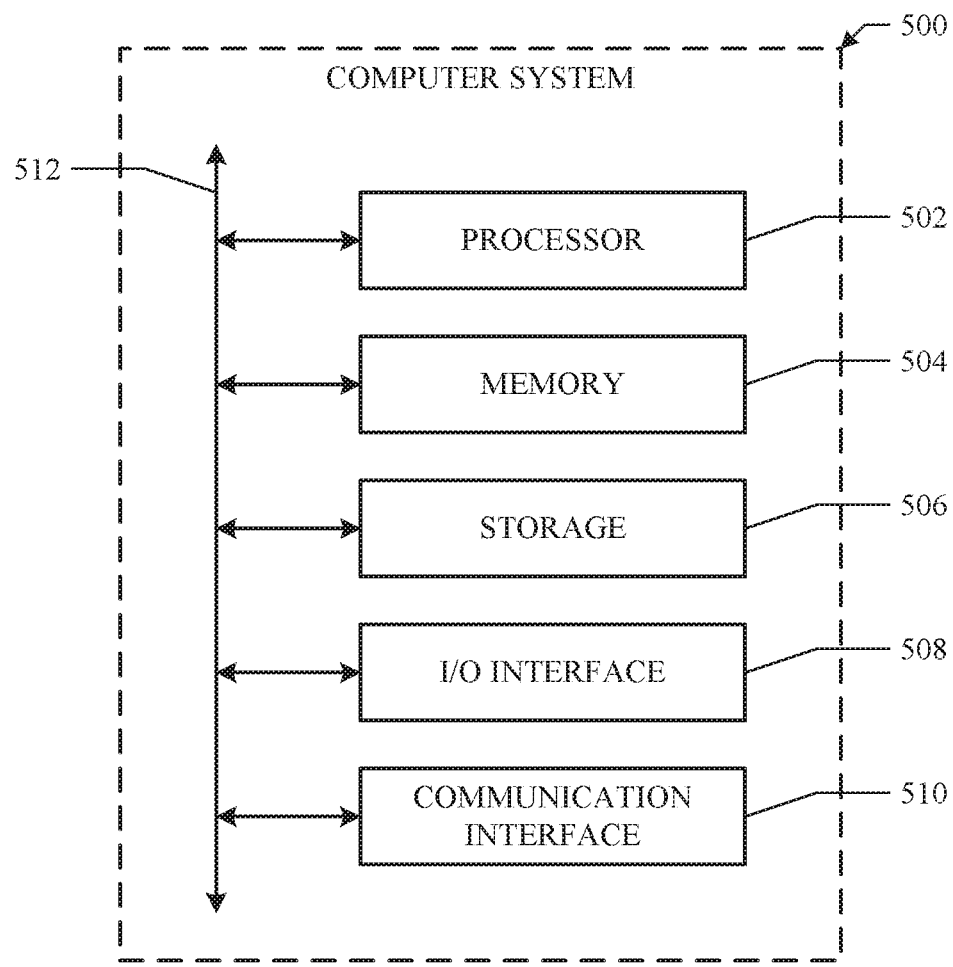
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then retrieve the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computer server machine, receiving information about a first media player event from an application installed on a client device, the information about the first media player event comprising an identifier for a viewing session and a first event identifier indicating an order of the first media player event;
by the computer server machine, updating a current state of a state machine from a first state to a second state based on the information about the first media player event, wherein the state machine corresponds to the viewing session, wherein the state machine comprises a plurality of states representing respectively corresponding states of the viewing session, wherein a directional edge representing a media player event from a source state to a destination state exists in the state machine if the media player event causes a transition from the source state to the destination state in the viewing session, and wherein the second state is connected from the first state via a directed edge representing the first media player event in the state machine;
by the computer server machine, based on the second state of the state machine, identifying a current state of the viewing session;
by the computer server machine, receiving information about a second media player event from the application, the information about the second media player event comprising the identifier for the viewing session and a second event identifier indicating an order of the second media player event;
by the computer server machine, determining, based on the first event identifier and the second event identifier, that no information about a media player event from the application is missing;
by the computer server machine, upon determination, updating the current state of the state machine from the second state to a third state based on the information about the second media player event;

by the computer server machine, based on the third state of the state machine, identifying a subsequent state of the viewing session;
by the computer server machine, calculating metrics for the viewing session based on the current state and the subsequent state;
by the computer server machine, storing the metrics for the viewing session; and
by the computer server machine, generating a session summary of the viewing session, the session summary comprising information about the metrics for the viewing session.

2. The method of claim 1, further comprising:
receiving information about a third media player event associated with the viewing session from the application;
updating the current state of the state machine from the third state to a fourth state based on the information about the third media player event, wherein the fourth state is connected from the third state via a directed edge representing the third media player event in the state machine;
based on the fourth state of the state machine, identifying an updated state of the viewing session;
calculating updated metrics for the viewing session based on the metrics for the viewing session and the updated state;
storing the updated metrics for the viewing session; and
calculating a delta session summary of the viewing session based on the session summary and information about the updated metrics.

3. The method of claim 1, further comprising:
validating the information about the first media player event;
validating the information about the second media player event; and
sending the session summary to a third-party system when the information about the first media player event and the information about the second media player event have been validated.

4. The method of claim 1, further comprising:
validating the information about the metrics; and
sending the session summary to a third-party system when the information about the metrics is validated.

5. The method of claim 2, wherein:
the updated metrics comprise a viewing duration of the viewing session; and
the method further comprising:
receiving, from the application, information about a total duration of a media item associated with the viewing session;
calculating a view threshold based on the total duration of the media item associated with the viewing session;
assessing a determination as to whether the viewing duration satisfies the view threshold; and
storing the determination as part of the metrics.

6. The method of claim 1, further comprising:
receiving information about a third media player event associated with the viewing session from the application;
updating the current state of the state machine from the third state to a fourth state based on the information about the third media player event, wherein the fourth state is connected from the third state via a directed edge representing the third media player event in the state machine;
based on the fourth state of the state machine, identifying an updated state of the viewing session;
calculating updated metrics for the viewing session based on the metrics for the viewing session and the updated state;
calculating a delta session summary of the viewing session based on the session summary and information about the updated metrics; and
if the media item comprises non-advertisement content, combining the session summary and the delta session summary into a complete session summary.

7. The method of claim 1, further comprising:
receiving information about a third media player event, wherein the third media player event occurs within a maximum duration for the viewing session;
receiving information about a fourth media player event, wherein the fourth media player event occurs at a time beyond the maximum duration for the viewing session;
using the state machine, identifying a final state of the viewing session using the information about the third media player event; and
calculating final metrics for the viewing session based on the subsequent state and the final state.

8. The method of claim 1, wherein:
the information about the first media player event comprises a first time stamp;
the information about the second media player event comprises a second time stamp; and
when the second time stamp indicates a time prior to the first time stamp:
the current state of the viewing session identified is based on the information about the second media player event; and
the subsequent state of the viewing session is identified based on the information about the first media player event.

9. One or more computer-readable non-transitory storage media embodying software that is operable when executed to:
receive information about a first media player event from an application installed on a client device, the information about the first media player event comprising an identifier for a viewing session and a first event identifier indicating an order of the first media player event;
update a current state of a state machine from a first state to a second state based on the information about the first media player event, wherein the state machine corresponds to the viewing session, wherein the state machine comprises a plurality of states representing respectively corresponding states of the viewing session, wherein a directional edge representing a media player event from a source state to a destination state exists in the state machine if the media player event causes a transition from the source state to the destination state in the viewing session, and wherein the second state is connected from the first state via a directed edge representing the first media player event in the state machine;
based on the second state of the state machine, identify a current state of the viewing session;
receive information about a second media player event from the application, the information about the second media player event comprising the identifier for the viewing session and a second event identifier indicating an order of the second media player event;

determine, based on the first event identifier and the second event identifier, that no information about a media player event from the application is missing;

upon determination, update the current state of the state machine from the second state to a third state based on the information about the second media player event;

based on the third state of the state machine, identify a subsequent state of the viewing session;

calculate metrics for the viewing session based on the current state and the subsequent state;

store the metrics for the viewing session; and generate a session summary of the viewing session, the session summary comprising information about the metrics for the viewing session.

10. The media of claim 9, wherein the software is further operable when executed to:

receive information about a third media player event associated with the viewing session from the application;

update the current state of the state machine from the third state to a fourth state based on the information about the third media player event, wherein the fourth state is connected from the third state via a directed edge representing the third media player event in the state machine;

based on the fourth state of the state machine, identify an updated state of the viewing session;

calculate updated metrics for the viewing session based on the metrics for the viewing session and the updated state;

store the updated metrics for the viewing session; and calculate a delta session summary of the viewing session based on the session summary and information about the updated metrics.

11. The media of claim 9, wherein the software is further operable when executed to:

validate the information about the first media player event;

validate the information about the second media player event; and send the session summary to a third-party system when the information about the first media player event and the information about the second media player event have been validated.

12. The media of claim 9, wherein the software is further operable when executed to:

validate the information about the metrics; and send the session summary to a third-party system when the information about the metrics is validated.

13. The media of claim 10, wherein:

the updated metrics comprise a viewing duration of the viewing session; and the software is further operable when executed to:

receive, from the application, information about a total duration of a media item associated with the viewing session;

calculate a view threshold based on the total duration of the media item associated with the viewing session;

assess a determination as to whether the viewing duration satisfies the view threshold; and store the determination as part of the metrics.

14. The media of claim 9, wherein the software is further operable when executed to:

receive information about a third media player event associated with the viewing session from the application;

update the current state of the state machine from the third state to a fourth state based on the information about the third media player event, wherein the fourth state is connected from the third state via a directed edge representing the third media player event in the state machine;

based on the fourth state of the state machine, identify an updated state of the viewing session;

calculate updated metrics for the viewing session based on the metrics for the viewing session and the updated state;

calculate a delta session summary of the viewing session based on the session summary and information about the updated metrics; and if the media item comprises non-advertisement content, combine the session summary and the delta session summary into a complete session summary.

15. The media of claim 9, wherein the software is further operable when executed to:

receive information about a third media player event, wherein the third media player event occurs within a maximum duration for the viewing session;

receive information about a fourth media player event, wherein the fourth media player event occurs at a time beyond the maximum duration for the viewing session;

identify a final state of the viewing session using the information about the third media player event; and calculate final metrics for the viewing session based on the subsequent state and the final state.

16. The media of claim 9, wherein:

the information about the first media player event comprises a first time stamp;

the information about the second media player event comprises a second time stamp; and when the second time stamp indicates a time prior to the first time stamp:

the current state of the viewing session identified is based on the information about the second media player event; and the subsequent state of the viewing session is identified based on the information about the first media player event.

17. A system comprising: one or more processors; and a memory coupled to the processors comprising instructions executable by the processors, the processors being operable when executing the instructions to:

receive information about a first media player event from an application installed on a client device, the information about the first media player event comprising an identifier for a viewing session and a first event identifier indicating an order of the first media player event;

update a current state of a state machine from a first state to a second state based on the information about the first media player event, wherein the state machine corresponds to the viewing session, wherein the state machine comprises a plurality of states representing respectively corresponding states of the viewing session, wherein a directional edge representing a media player event from a source state to a destination state exists in the state machine if the media player event causes a transition from the source state to the destination state in the viewing session, and wherein the second state is connected from the first state via a directed edge representing the first media player event in the state machine;

based on the second state of the state machine, identify a current state of the viewing session;

receive information about a second media player event from the application, the information about the second media player event comprising the identifier for the viewing session and a second event identifier indicating an order of the second media player event;

determine, based on the first event identifier and the second event identifier, that no information about a media player event from the application is missing;

upon determination, update the current state of the state machine from the second state to a third state based on the information about the second media player event;

based on the third state of the state machine, identify a subsequent state of the viewing session;

calculate metrics for the viewing session based on the current state and the subsequent state;

store the metrics for the viewing session; and generate a session summary of the viewing session, the session summary comprising information about the metrics for the viewing session.

18. The system of claim 17, wherein the processors are further operable when executing the instructions to:

receive information about a third media player event associated with the viewing session from the application;

update the current state of the state machine from the third state to a fourth state based on the information about the third media player event, wherein the fourth state is connected from the third state via a directed edge representing the third media player event in the state machine;

based on the fourth state of the state machine, identify an updated state of the viewing session;

calculate updated metrics for the viewing session based on the metrics for the viewing session and the updated state;

store the updated metrics for the viewing session; and calculate a delta session summary of the viewing session based on the session summary and information about the updated metrics.

19. The system of claim 17, wherein the processors are further operable when executing the instructions to:

validate the information about the first media player event;

validate the information about the second media player event; and send the session summary to a third-party system when the information about the first media player event and the information about the second media player event have been validated.

20. The system of claim 17, wherein the processors are further operable when executing the instructions to:

receive information about a third media player event associated with the viewing session from the application;

update the current state of the state machine from the third state to a fourth state based on the information about the third media player event, wherein the fourth state is connected from the third state via a directed edge representing the third media player event in the state machine;

based on the fourth state of the state machine, identify an updated state of the viewing session;

calculate updated metrics for the viewing session based on the metrics for the viewing session and the updated state;

calculate a delta session summary of the viewing session based on the session summary and information about the updated metrics; and if the media item comprises non-advertisement content, combine the session summary and the delta session summary into a complete session summary.

* * * * *